United States Patent
Ahouanto et al.

(10) Patent No.: US 6,461,460 B2
(45) Date of Patent: Oct. 8, 2002

(54) PROCESS FOR THE MANUFACTURE OF A TIRE WITHOUT BEAD WIRE

(75) Inventors: Michel Ahouanto, Enval (FR); Luc Bestgen, Chatel-Guyon (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 21 days.

(21) Appl. No.: 09/833,048

(22) Filed: Apr. 11, 2001

(65) Prior Publication Data

US 2001/0020511 A1 Sep. 13, 2001

Related U.S. Application Data

(63) Continuation of application No. PCT/EP99/07599, filed on Oct. 11, 1999.

(30) Foreign Application Priority Data

Oct. 16, 1998 (FR) .............................. 98 13052

(51) Int. Cl.$^7$ .............................. B29D 30/20
(52) U.S. Cl. ............... 156/126; 156/130.7; 156/131; 156/132; 156/135; 156/136; 156/421.4; 156/421.8
(58) Field of Search .................. 156/117, 123, 156/124, 126, 130, 130.7, 131, 132, 135, 136, 421.4, 421.8; 152/539, 540

(56) References Cited

U.S. PATENT DOCUMENTS

| 2,966,933 | A |   | 1/1961 | Boussu et al. ............... 152/362 |
| 3,185,607 | A | * | 5/1965 | Nebout ........................ 156/132 |
| 3,558,389 | A | * | 1/1971 | Bezbatchenko, Jr. ........ 156/126 |
| 5,961,756 | A | * | 10/1999 | Ahouanto et al. ........... 152/540 |

FOREIGN PATENT DOCUMENTS

| AU | 697815  | 10/1998 |
| DE | 2430495 | 1/1976  |
| GB | 2276357 | 9/1994  |

* cited by examiner

*Primary Examiner*—Geoffrey L. Knable
(74) *Attorney, Agent, or Firm*—Baker Botts L.L.P.

(57) ABSTRACT

A process for the manufacture of a tire the beads of which are without anchoring bead wires and are reinforced by complexes of layers of reinforcement elements of low angle, around which complexes the radial carcass reinforcement is anchored by winding, said process being characterized in that each complex is produced independently of the carcass reinforcement blank, the manufacture of said complex including using at least one raw blank of reinforcement elements which are oriented at a higher angle than the angle to be obtained in the vulcanized state, subjecting said ply to pre-extension before formation of a two-layer sleeve, the pitch, angle and width characteristics of which are obtained by pantograph effect upon a second extension.

8 Claims, 5 Drawing Sheets

PROCESS FOR THE MANUFACTURE OF A TIRE WITHOUT BEAD WIRE

This is a continuation of pending application PCT/EP99/07599, filed Oct. 11, 1999.

BACKGROUND OF THE INVENTION

The invention relates to the manufacture of a tire, the beads of which are without bead wires as means for absorbing the tensile stresses of the carcass reinforcement and as means for holding said beads securely on the rim seats on which said beads will be mounted.

Application FR 2 717 425 describes a tire with a radial carcass reinforcement extending from one bead to the other, surmounted radially by a crown reinforcement which in turn is surmounted by a tread, characterized in that each bead, which is without a bead wire, comprises firstly an annular element, the tensile strength of which in the circumferential direction is substantially less than that which would be necessary for a bead wire in a known tire of the same dimension, the axis of this annular element being the axis of revolution of the tire, and secondly a bead reinforcement armature made of at least two reinforcement layers in contact with or in proximity to the annular element, said reinforcement layers each comprising reinforcement elements which are parallel to each other in each layer, crossed from one layer to the adjacent layer, forming with the circumferential direction an angle $\beta$ such that $0<\beta\leq10°$, all these layers having a resistance to rupture in traction at least equal to that which would be necessary for a bead wire in a known tire of the same dimension. The mechanical strength of the bead reinforcement armature is therefore the essential contribution to the mechanical resistance of the bead reinforcing assembly formed by the annular element and said armature, this assembly thus making it possible to replace the bead wire of a conventional tire. The carcass reinforcement winds around the annular element, and the reinforcement layers have their radially upper ends located in the bead at different heights.

The complex formed by the two layers of the bead reinforcement armature and possibly by the annular element, which is intended to facilitate manufacture of such a complex and consequently the tire, may be produced during said building of the blank on the building drum of the same name.

Whatever the method or process employed, the necessity of having angles of reinforcement elements of between 0° and 10°, and preferably 520 or less, in the vulcanized tire results in serious difficulties when cutting the non-vulcanized plies of reinforcement elements to the desired angles, and also when butt-jointing the widths obtained, which difficulties may result in a loss of accuracy in the arrangement of the reinforcement layers relative to each other, but also relative to the products adjoining said layers. Said difficulties are also the cause of not inconsiderable losses of time in the industrial process, and increased manufacturing costs.

SUMMARY OF THE INVENTION

In order to overcome this state of affairs, the invention proposes, for the manufacture of a tire with radial carcass reinforcement extending from one bead to the other and with edges folded over to form carcass reinforcement upturns, each bead being without a bead wire and reinforced by a complex of axially adjacent layers of reinforcement elements which form with the circumferential direction an angle $\beta$ such that $0°<\beta\leq10°$, the carcass reinforcement winding around said complex to form a carcass reinforcement upturn, a process characterised in that the complex of axially adjacent layers is manufactured separately from the carcass reinforcement blank, said manufacturing operation comprising the following steps:

a) laying at least one ply of reinforcement elements oriented at an angle $\alpha$, such that $\alpha\geq10°$, on a laying drum of radius R, b) extending said ply by increasing the drum radius to a value $R_1$ greater than R, c) forming a cylindrical sleeve of two layers of elements crossed from one layer to the next, with an angle $\alpha\geq10°$, d) increasing for a second time the radius of the laying drum to a radius $R_2$ such that the final angle $\beta$ of the reinforcements is obtained by pantograph effect, e) finishing the building of the complex of adjacent layers, f) removing the finished complex from its laying drum and laying it at the desired location on the building drum for the cylindrical carcass reinforcement blank.

The sleeve of two layers of crossed elements can advantageously be formed in two ways:

either the first step of manufacture consists in laying a single ply of parallel elements oriented at the angle $\alpha$, and the two crossed layers can be formed by folding over part of the ply on to the other part of said ply, or the first step consists in laying two plies independently of one another on two independent laying drums of radii R and R', to make allowance for the thickness of one ply, and extending them to radii $R_1$ and $R'_1$, the two layers possibly being formed by superposition on the drum of radius $R_1$.

In the former case above, once the folding-over of the ply on itself has been effected, the increase in the radius of the drum to the value $R_2$ making it possible to arrive at the final angle $\beta$, a complex formed of two folded-over layers of crossed elements is obtained directly.

In the second case in question, once the laying and superposition of two plies on the drum of radius $R_1$ has been effected, the increase in the radius to the value $R_2$ making it possible to arrive at the final angle $\beta$, a complex formed of two non-folded-over layers of crossed elements is obtained directly, but the building of a complex of four folded-over layers can also be terminated by means of folding over the two plies of crossed elements on themselves at an angle $\beta$.

The folding of one or more plies over on themselves may be effected with or without the aid of a circular ring, whether this folding be effected in the case of the radius $R_1$ or whether it be effected in the case of the radius $R_2$. In the former case in question, said circular ring is then provided with a low modulus of extension for a certain range of relative elongation $\epsilon_0$ and a high modulus for the values of relative elongation outside the upper limit of said range, the relative elongation $\epsilon_0$ corresponding to the passage from the radius $R_1$ to the radius $R_2$ and being equal to $(R_2-R_1)/R_1$. In the latter case in question, the circular ring is inextensible.

The invention will be better understood with reference to the drawings appended to the description, illustrating in non-limitative manner examples of embodiments.

DESCRIPTION OF THE DRAWINGS

Figure 1A:
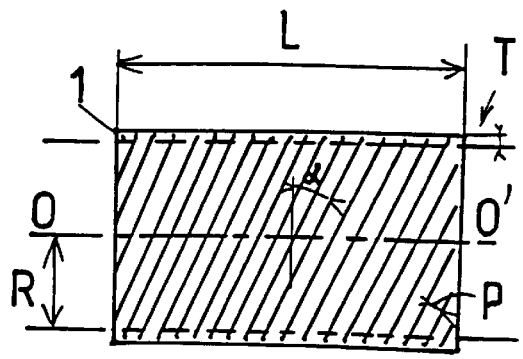
FIGS. 1A to 1H diagram the different steps of manufacture of a complex used in a tire.

In order to manufacture a complex as described above for a tire of dimension 175/70.R.13, a ply 1 formed of textile cables of aromatic polyamide is laid on the expandable cylindrical drum T, of axis OO' and of a radius R of 163 mm (drum illustrated diagrammatically in FIG. 1A), at a density of 80 cords per dm, corresponding to a pitch p of 1.25 mm between cables, said cables forming an angle $+\alpha$ of 10° with the circumferential direction and being calendered with a suitable rubber mix. Said ply has an axial width L of 86 mm and a total radial thickness e, including calendering, of 1 mm.

Figure 1B:
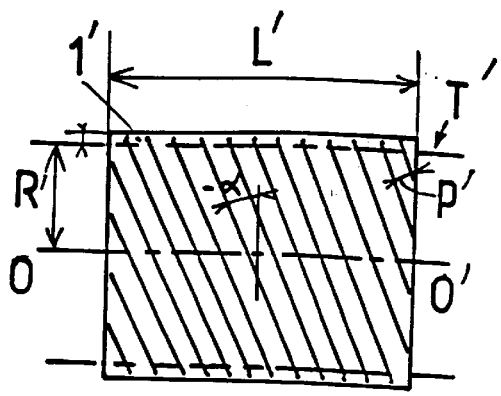

On a drum T' (FIG. 1B) of the same type as the drum T there is laid a second ply 1' formed of the same cables as those of the ply 1, calendered with the same rubber mix and being spaced apart axially by the same pitch p' of 1.25 mm. Said cables form with the circumferential direction the same angle $\alpha$ in absolute value but of opposite direction $-\alpha$ to the direction of the cables of the ply 1. To make allowance for the thickness e' of 1 mm of the ply 1', which is identical to the thickness e of the ply 1, said ply 1' is laid on the drum T' of radius R' of 164 mm. Said ply 1' has an axial width L' of 66 mm.

Figure 1C:
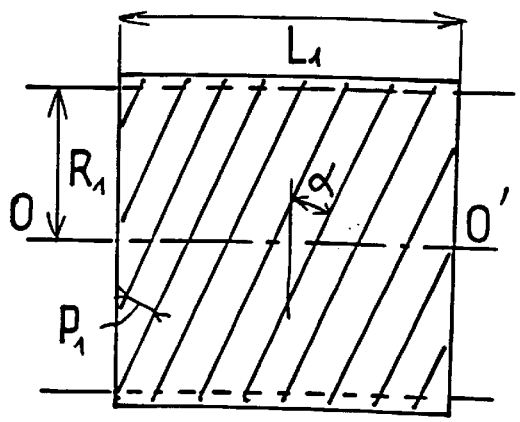
Figure 1D:
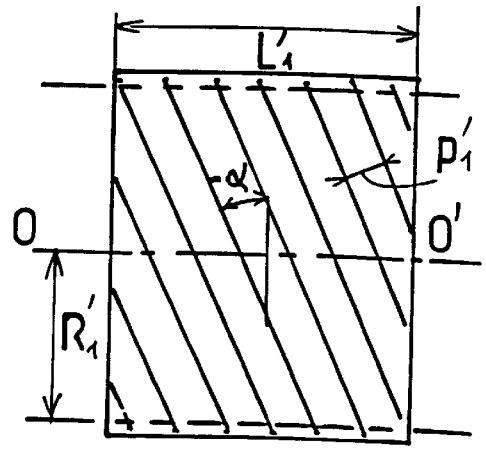

The two drums T and T' (FIGS. 1C and 1D) have their radii R and R' respectively brought to the values $R_1$ and $R'_1$ respectively, which are equal to 326 and 327 mm. The extension of the plies from the radii R and R' to the radii $R_1$ and $R'_1$ does not substantially modify their respective widths L and L', which remain practically equal to 86 mm and 66 mm, and does not substantially modify the angles of the cables, which remain practically equal to $+\alpha$ and $-\alpha$. On the other hand, said extension does modify the value of the pitches between cables, which increase from the values p and p' to the values $p_1$ and $p'_1$, such that the ratios $p_1/p$ and $p'_1/p'$ are equal to each other and to the ratio $R_1/R$. Likewise, the thicknesses of plies e and e' respectively become such that $e_1/e$ and $e'_1/e'$ are equal to $R/R_1$.

Figure 1E:
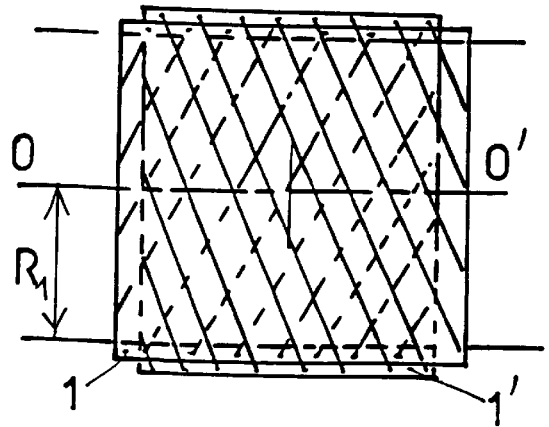

The two plies 1 and 1' in the form of cylindrical rings of internal radii $R_1$ and $R'_1$ are then transferred and joined (FIG. 1E) on one and the same drum T, the ply 1' being superposed radially to the ply 1 so as to produce a cylindrical sleeve formed of two plies 1 and 1', the cables of which are parallel to each other in each ply and crossed from one ply to the next, forming an angle $\alpha$ with the circumferential direction.

It is obvious that the manipulation of the two plies 1 and 1' in the non-vulcanized state on the two drums T and T' and their joining on one and the same drum requires a certain number of precautions, and particular coating said plies with an anti-adhesion product if necessary.

Figure 1F:
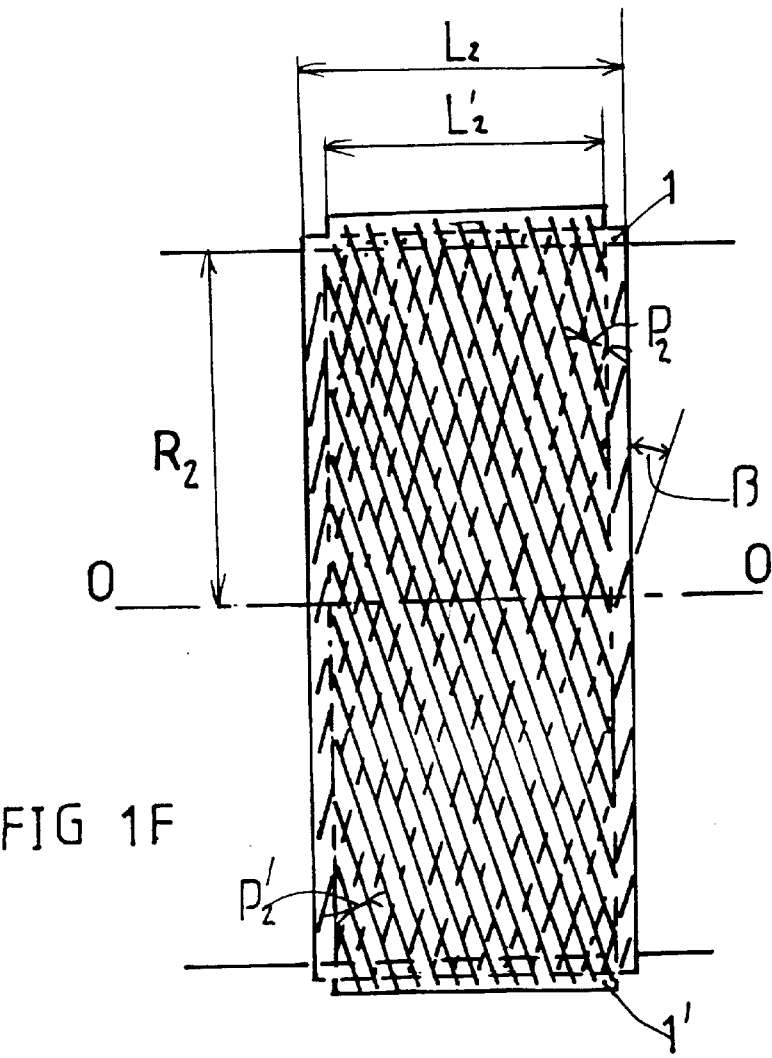

The cylindrical sleeve formed by the two plies 1 and 1' of internal radius $R_1$ is then extended such that the radius value $R_1$ is brought to the value $R_2$, equal to 331 mm (FIG. 1F), and such that, by pantograph effect, the angles $+\alpha$ and $-\alpha$ decrease to become the angles $+\beta$ and $-\beta$ equal to 5°, such that the axial widths $L_1$ and $L'_1$ of the two plies 1 and 1 decrease greatly to become $L_2$ and $L'_2$, equal respectively to 43 and 33 mm. The pitches $P_2$ and $P'_2$, on the other hand, are significantly less than the pitches $p_1$ and $P'_1$ since a value substantially equal to 0.96 mm is obtained for $p_2$ and $p'_2$ instead of 1.92 mm for the two pitches $p_1$ and $p'_1$. The thicknesses of plies 1 and 1', which are initially equal to 1 mm, greatly reduced upon the extension to the radii $R_1$ and $R'_1$, become substantially equal to 1 mm upon the extension of the sleeve of the two plies to the radius $R_2$, said radius $R_2$ being equal to or slightly less than the radius of the radially inner end of the complex of layers in the vulcanized state, which complex replaces the bead wire and the reinforcement ply usually used.

Figures 1G, 1H:
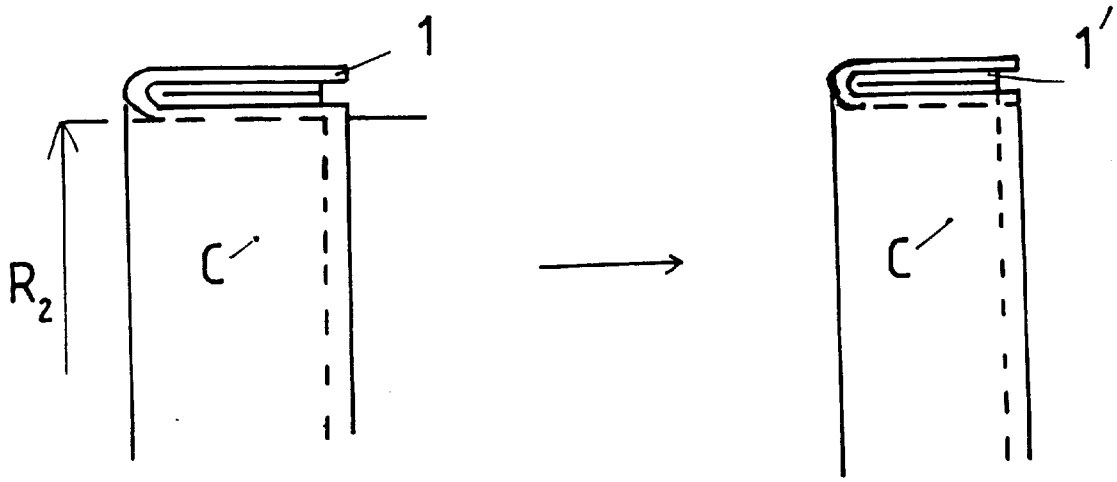
Figure 2D:
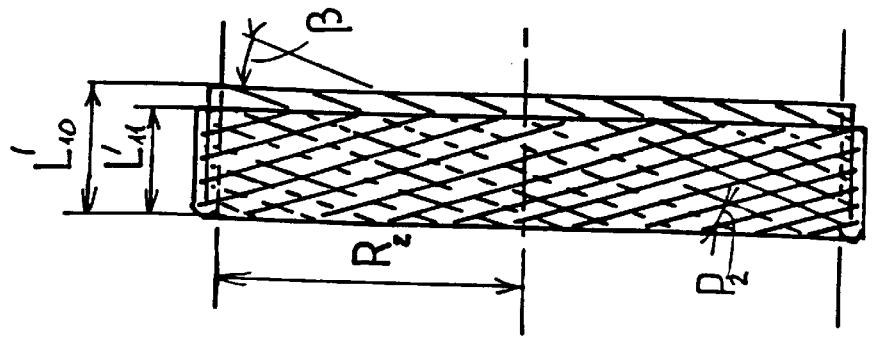
FIGS. 2A to 2D show a variant of the process according to the invention.
Figure 2C:
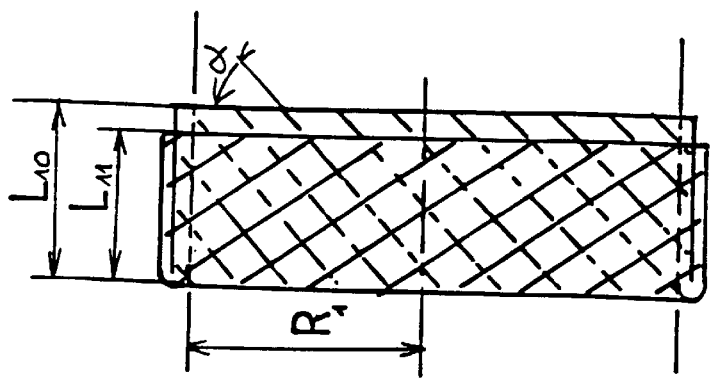
Figure 2B:
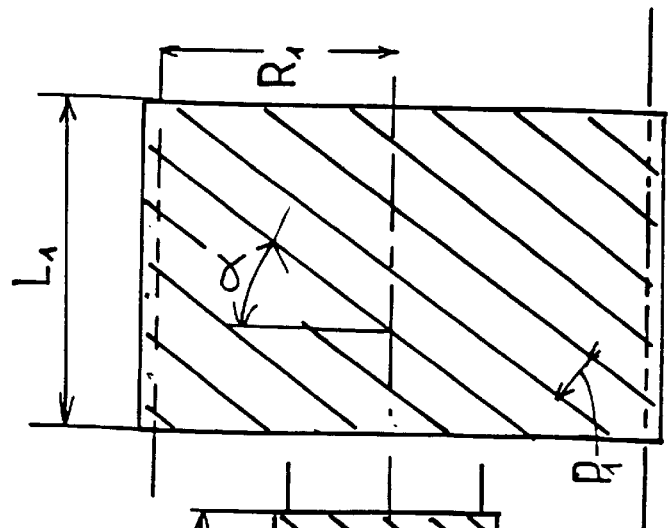
Figure 2A:
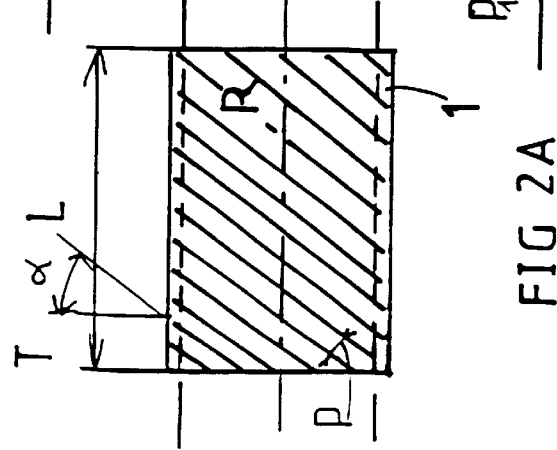

The manufacture of the desired complex ends, in the case described, by folding over the two plies 1 and 1' on themselves, as shown in FIG. 1G, to obtain, in the non-vulcanized state, the complex C as it will appear on the vulcanized tire, said complex being formed of four layers of textile cables crossed from one ply to the next, forming an angle substantially equal to 5° with the circumferential direction.

Once the plies 1 and 1' have been folded over, said complex is then removed from the drum T (FIG. 1H) and transferred to the desired point on the building drum for the cylindrical raw blank of the carcass reinforcement. Said carcass reinforcement is turned around said complex C, and once said raw blank has been finished, the latter is transformed into a toric blank under the action of the internal pressure of the shaping membrane of the building drum. The complex C then adopts a substantially vertical position with modifications of the laying angles according to the parallel radius in question.

FIG. 2 shows a simplified method of manufacture for obtaining a two-layer complex C, said two layers being obtained by folding a ply over onto itself. The ply 1, of characteristics identical to the ply 1 previously described above, is laid (FIG. 2A) on the drum of radius R. The ply 1 is then extended (FIG. 2B) so that its internal radius becomes $R_1$, the initial width L and the angle $\alpha$ of these reinforcement cables not varying during the extension operation. Said ply is folded over on itself (FIG. 2C), the folding operation being effected on the drum T, so as to obtain two layers of axial widths $L_{10}$ and $L_{11}$, the width $L_{10}$ of the radially inner layer being greater than the width L/2 and the width $L_{11}$ of the radially upper layer being less than L/2. The two layers being superposed, the radius $R_1$ of the laying drum T is increased to the value $R_2$ (FIG. 2D), which operation makes it possible to obtain the final angle $\beta$ of the crossed cables of the two layers forming the complex C in the non-vulcanized state, the radius $R_2$ being, in this case as well, slightly greater than the radius of the end of said complex in the vulcanized tire, which end is radially closest to the axis of rotation of said tire.

Figure 3C:
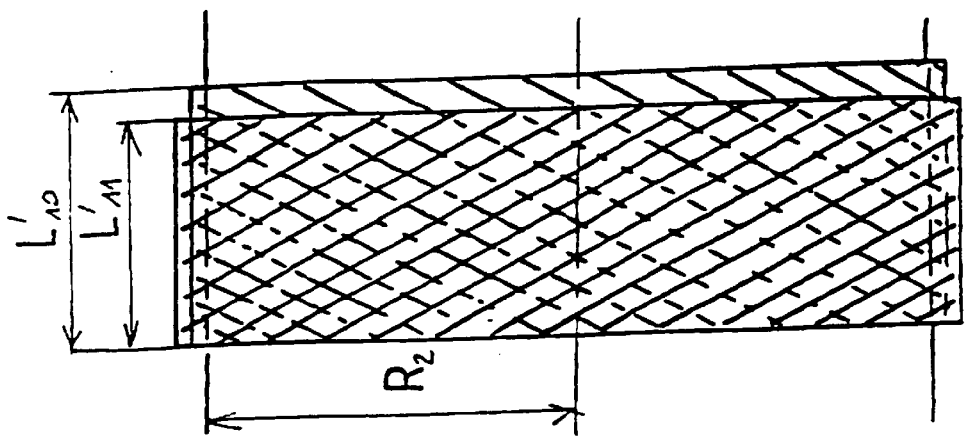
FIGS. 3A to 3C show a second variant of the process, in part.
Figure 3B:
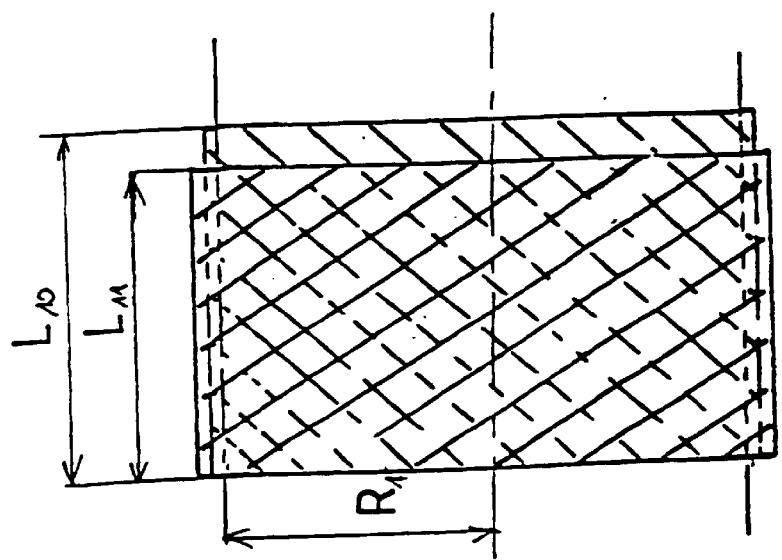
Figure 3A:
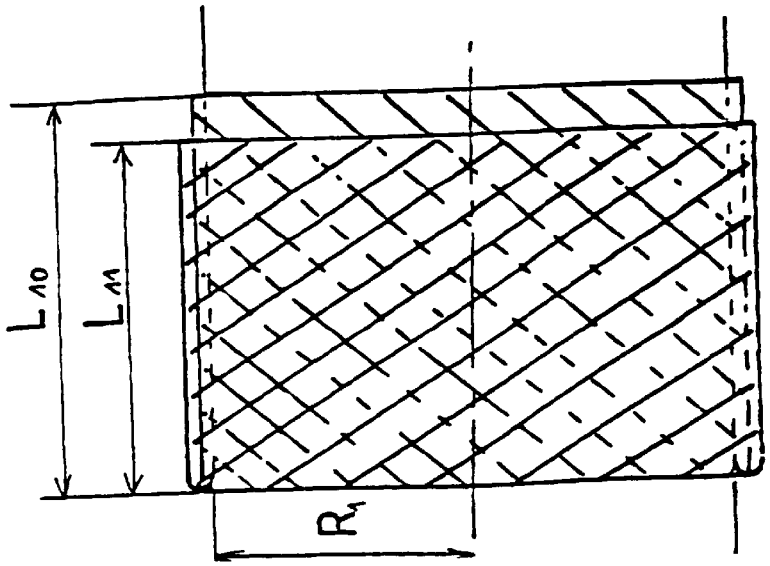

The method of manufacture, the steps of which are illustrated in part in FIG. 3, is a method derived from that shown in FIG. 2 which is intended to obtain either a complex of two non-folded-over layers or a four-layer complex produced from two plies folded over on themselves. The preliminary steps (not shown) of said method are the same as steps 2A to 2C of the method shown in FIG. 2. The cylindrical sleeve formed of two layers, obtained by the folding on to the drum T of radius $R_1$ of a ply 1 of reinforcement elements oriented at the angle $\alpha$, at a pitch $p_1$ and the widths $L_{10}$ and $L_{11}$ of which have values on either side of the value $L_1/2$, is cut off from its upturn by cutting the edge of said upturn (FIG. 3A) so as to form a cylindrical sleeve of two layers having free ends (FIG. 3B), which sleeve is in the same configuration as the sleeve of FIG. 1E of the first example described, with the advantage of having been obtained by using a single drum, and not two drums. The cutting of the upturn is effected by known means, be they conventional means such as straight or circular shears and/or blades, or be they more developed, such as water jets or a laser beam. Said sleeve is then treated in the same manner as previously, that is to say, extended (FIG. 3C) to a radius $R_2$ to obtain the desired angle, pitch and widths. It may remain as such and form a complex C having two non-folded-over layers in the vulcanized state in the tire, or alternatively undergo the operations as shown in FIGS. 1G to 1H, and result in the vulcanized state in a complex C of four folded-over layers.

Figure 4A:
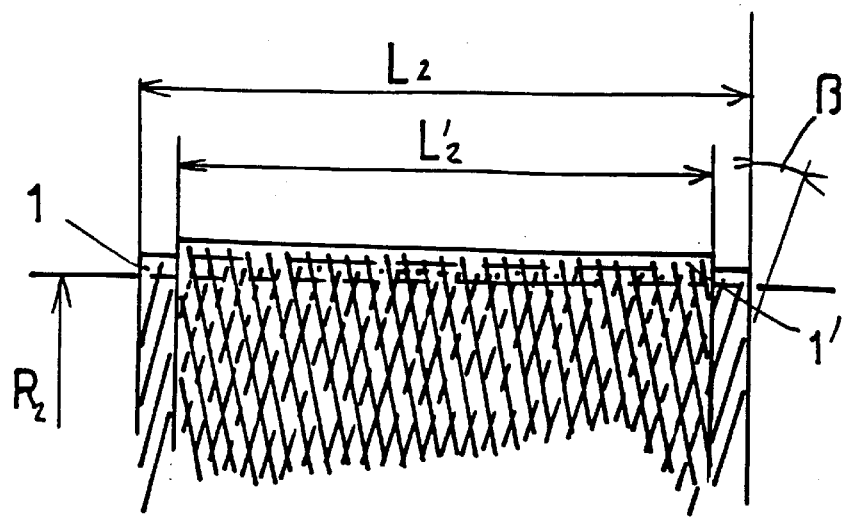
FIGS. 4A to 4D show a third variant using a circular ring.
Figure 4B:
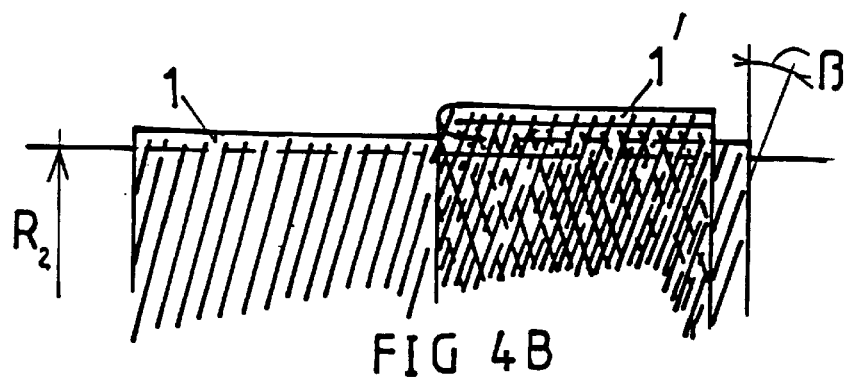
Figure 4C:
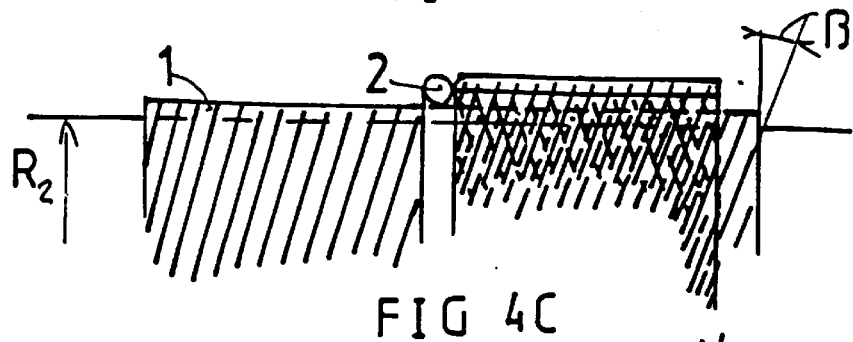
Figure 4D:
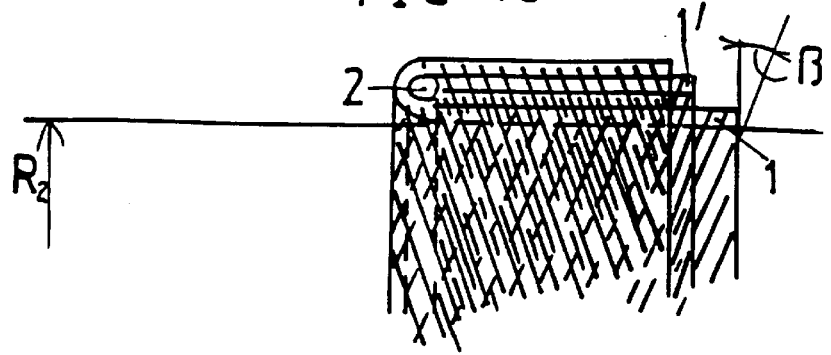

The folding of (a) ply (plies) on itself (themselves) can be effected simply or with the aid of a circular ring. FIG. 4 shows an example of folding of two plies 1 and 1' forming a cylindrical sleeve of radius $R_2$, the two plies being composed of textile cables oriented at the angle β, parallel with each other in a ply with a single pitch $P_2$ and of respective widths $L_2$ and $L'_2$ (FIG. 4A). The finishing of the sleeve to obtain a four-layer complex is effected by:

- folding the ply 1' radially farthest from the axis of the drum T over on itself (FIG. 4B),
- then axially laying the circular ring 2 on the outside of the upturn of the ply 1' (FIG. 4C),
- finally folding the ply 1 around the ring 2 and the upturn of the ply 1' (FIG. 4D).

Thus, the process according to the invention, owing to the presence of the step of pre-extension to a radius $R_1$ permitting the increase in the pitch between reinforcement elements, makes it possible to cut plies having elements which have consequent angles and to work non-vulcanized plies of correct initial thickness and a sufficient initial pitch to provide said plies with a strength such that they can be manipulated individually without the risk of tearing for example between reinforcement elements. The extension to the radius $R_2$ results in layers of crossed elements being obtained with pitches between elements and thicknesses which are as low as possible in the vulcanized state.

We claim:

1. A process for the manufacture of a tire with radial carcass reinforcement extending from one bead to the other and with edges folded over to form carcass reinforcement upturns, each bead being without a bead wire and reinforced by a complex C of axially adjacent layers of reinforcement elements which form an angle β with the circumferential direction such that $0°<β≦10°$, the carcass reinforcement winding around said complex to form a carcass reinforcement upturn, characterized in that the complex C of axially adjacent layers is manufactured separately from the carcass reinforcement blank, said manufacturing operation comprising the following steps:

a) laying at least one ply of reinforcement elements oriented at an angle α, such that $α≧10°$, on a laying drum of radius R, b) extending said ply by increasing the drum radius to a value $R_1$ greater than R, c) forming a cylindrical sleeve of two layers of elements crossed from one layer to the next, with an angle $α≧10°$, d) increasing for a second time the radius of the laying drum to a radius $R_2$ such that the final angle β of the reinforcement elements is obtained by pantograph effect, e) finishing the building of the complex of adjacent layers, f) removing the finished complex from its laying drum and laying it at the desired location on the building drum for the cylindrical carcass reinforcement blank.

2. A process according to claim 1, characterized in that the formation of the sleeve of two folded-over layers of crossed elements is effected after the laying during the first step on a drum of radius R of a single ply of crossed elements oriented at the angle α, said laying being followed by the extension of said ply to a radius $R_1$, the two layers being formed by folding over part of the ply on to the other part of said ply on the drum of radius $R_1$.

3. A process according to claim 1, characterized in that the formation of the sleeve of two non-folded-over layers of crossed elements is effected after the laying during the first step of two plies independently of each other on two independent laying drums of radii R and R', said laying being followed by extension to radii $R_1$ and $R'_1$ to make allowance for the thickness of one ply, the two layers being formed by transfer and superposition of one ply on the other on the drum of radius $R_1$.

4. A process according to claim 1, characterized in that the formation of the sleeve of two non-folded-over layers of crossed elements is effected after the laying during the first step on a drum of radius R of a single ply of crossed elements oriented at the angle α, said laying being followed by the extension of said ply to a radius $R_1$, the two non-folded-over layers being formed by folding over part of the ply on to the other part of said ply on the drum of radius $R_1$ and cutting the upturned edge thus obtained.

5. A process for obtaining a complex of four folded-over layers, characterized in that a sleeve of two non-folded-over layers is formed in accordance with claim 3, the finishing of the complex being obtained by folding over the two layers having been extended so that the internal radius of said sleeve has become equal to $R_2$.

6. A process for obtaining a complex of four folded-over layers, characterized in that a sleeve of two non-folded-over layers is formed in accordance with claim 4, the finishing of the complex being obtained by folding over the two layers having been extended so that the internal radius of said sleeve has become equal to $R_2$.

7. A process according to claim 5, characterized in that the folding over of at least one of the layers is effected with the addition of and around a circular ring placed on said layer.

8. A process according to claim 6, characterized in that the folding over of at least one of the layers is effected with the addition of and around a circular ring placed on said layer.

* * * * *

UNITED STATES PATENT AND TRADEMARK OFFICE
CERTIFICATE OF CORRECTION

PATENT NO.     : 6,461,460 B2
DATED          : October 8, 2002
INVENTOR(S)    : Ahouanto et al.

It is certified that error appears in the above-identified patent and that said Letters Patent is hereby corrected as shown below:

Column 1,
Line 47, "520" should read -- 5° --

Column 3,
Line 63, "$P_2$ and $P'_2$," should read -- $p_2$ and $p'_2$, --
Line 64, "$P'_2$" should read -- $p'_2$ --

Signed and Sealed this

Eighth Day of April, 2003

JAMES E. ROGAN
*Director of the United States Patent and Trademark Office*